United States Patent [19]

Takezoe

[11] 4,242,749

[45] Dec. 30, 1980

[54] OPERATING SYSTEM FOR A DATA TRANSMISSION SYSTEM

[75] Inventor: Fumihiko Takezoe, Hachioji, Japan

[73] Assignee: Fuji Electric Co., Ltd., Japan

[21] Appl. No.: 967,634

[22] Filed: Dec. 8, 1978

[30] Foreign Application Priority Data

Dec. 30, 1977 [JP] Japan .................. 52-158454
Dec. 30, 1977 [JP] Japan .................. 52-158455

[51] Int. Cl.³ .............................................. H04J 3/00
[52] U.S. Cl. ......................................... 370/85; 370/90
[58] Field of Search ......... 179/15 AL, 15 BA, 15 BS; 370/79, 85-95, 100-108, 110; 364/200 MS File, 900 MS File; 340/147 R, 147 LP

[56] References Cited

U.S. PATENT DOCUMENTS

| 3,600,519 | 8/1971 | McNeilly et al. ........... 179/15 AL |
| 3,680,053 | 7/1972 | Cotton et al. .................. 179/15 AL |
| 4,090,035 | 5/1978 | Popkin .......................... 179/15 AL |
| 4,149,144 | 4/1979 | Diefendorfer .................. 179/15 AL |

*Primary Examiner*—Felix D. Gruber
*Assistant Examiner*—Kemeny
*Attorney, Agent, or Firm*—Staas and Halsey

[57] ABSTRACT

In a common-bus data transmission system, a "collating unit" is added to the port unit of a multimode terminal to compare the received instruction "mode assignment code" with the previously-set "mode setting" for agreement before allowing communication.

8 Claims, 7 Drawing Figures

OPERATING SYSTEM FOR A DATA TRANSMISSION SYSTEM

BACKGROUND OF THE INVENTION

1. Field of the Invention

This invention relates to an operating system for a data transmission system in which data transmission between selected terminal units is controlled, and more particularly to an operating system adapted to facilitate system enlargement and maintenance in a data transmission system in which a plurality of data stations, each having connected thereto a plurality of terminal units via a common bus, are interconnected in a linear, circular or network form via transmission circuits.

2. Description of the Prior Art

Figure 1:
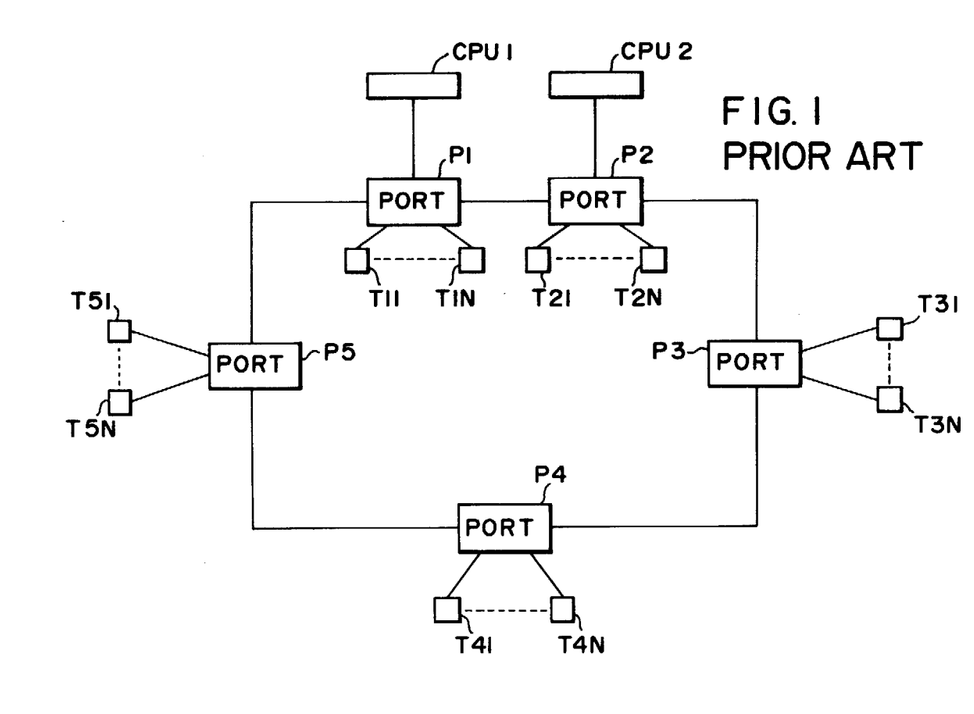
FIG. 1 is a block diagram explanatory of the arrangement of a data transmission system.

In recent years, a data highway system has been used which makes use of time division multiplex transmission for the purpose of reducing fabrication and installation costs of transmission cables, and such system are now employed for plant control or the like. In such a data highway system, central control stations CPU1 and CPU2, each typically having an electronic computer or the like and a data station (hereinafter referred to as a port) P1 through P5, each having accommodated therein a plurality of terminal units, are interconnected in a loop, for example, as shown in FIG. 1, and data transmission is achieved between the central control stations and the terminal units or between the terminal units. Since the data transmission takes place via a pair of transmission lines in such a data highway system, there is a strong demand for easy system enlargement and maintenance, as compared with other conventional transmission system. To meet the demand, for instance, in the case of system enlargement, a port is installed in advance at the place of enlargement so as to enable the enlargement by an on-line operation, the terminal units to be newly added are connected to the port and their operation is checked for malfunction after the connection of a power source and so on, and then the port is connected to a data circuit that is already provided. In system maintenance, operation of all terminal units can be tested by an on-line operation at any one of the ports without the necessity of an operator going to each port set up at a remote location. Accordingly, in the prior art, system enlargement and maintenance is carried out relatively easily in terms of hardware, but in such sysem enlargement and maintenance, the system diagnosis is usually effected by a software manipulation, which introduces the possibility of applying a faulty command to a terminal unit in normal operation due to a program error or the like to exert a serious influence on the system, such as causing its breakdown. The cause of such a drawback is that there is not provided anywhere in conventional data transmission systems a device for inhibiting an erroneous access to a terminal unit during system diagnosis.

Figure 2:
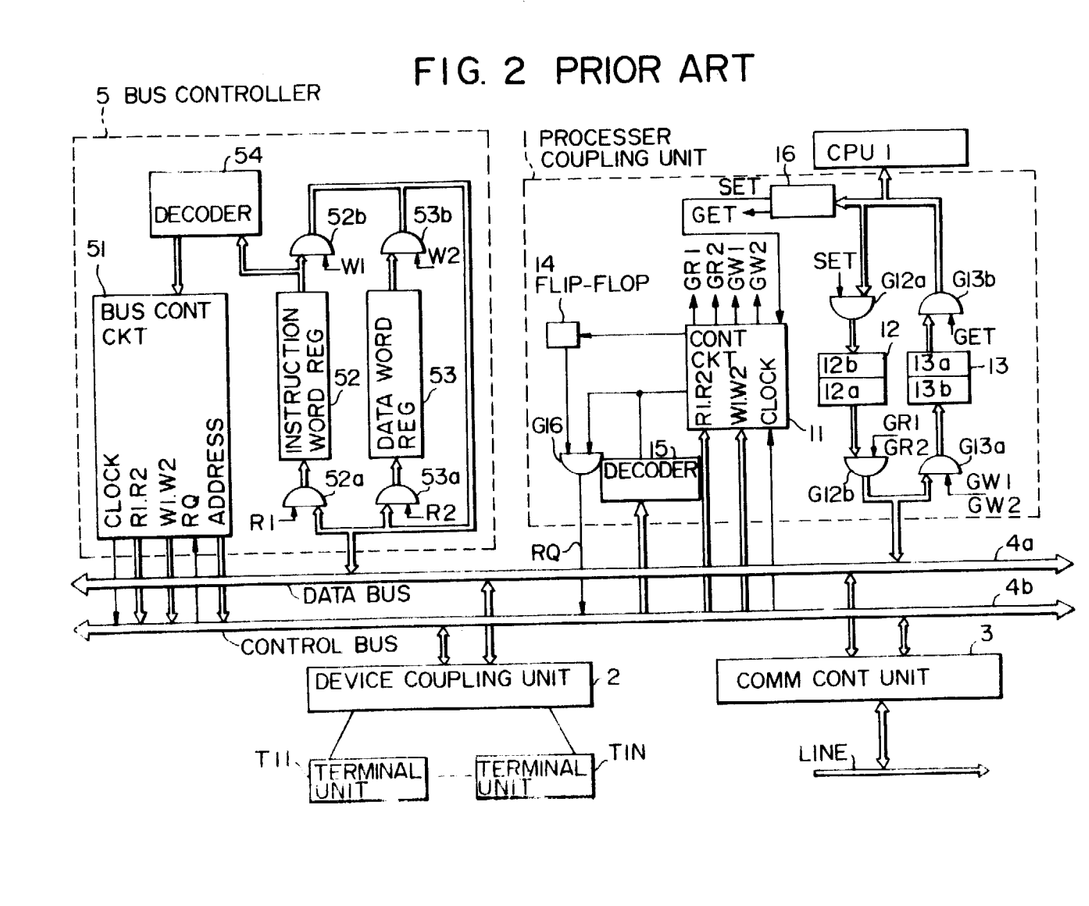
FIG. 2 is a block diagram showing a conventional port.

That is, the conventional port P1 used in the data transmission system of FIG. 1 comprises, as shown in FIG. 2, a processor coupling unit 1 having the function of controlling the interface between the port and the central control station CPU1, a device coupling unit 2 having a function of controlling the interface between the port and each terminal unit, a communication control unit 3 for transferring data to other ports via a line, a data bus 4a and a control bus 4b for the information transfer among the three units 1 through 3 and a bus controller 5 for controlling the buses. FIG. 2 indicates a processor coupling control circuit 11; a sending frame resister 12 for temporarily setting information from the central control station CPU1; a receiving frame register 13 for temporarily setting information to be sent to the central control station CPU1; input and output gate circuits G12a, G12b, G13a and G13b for the sending frame register 12 and the receiving frame register 13; a transfer request flip-flop 14; a decoder 15; a circuit 16 for controlling the interface between the port P1 and the central control station CPU1; a bus control circuit 51; an instruction word register 52 for temporarily setting an instruction word included in a transmission frame; a data word register 53 for temporarily setting a data word included in the transmission frame; an instruction word decoder 54; and input and output gate circuits 52a, 52b, 53a and 53b for the instruction word register 52 or the data word register 53.

Now, a description will be given of the operation of each unit, for example, in connection with the case of data from the central control station CPU1 being written in a terminal unit T11. At first, the data sent out from the central control station CPU1 and an instruction word composed of the destination of the data and like information are provided to the input gate circuit G12a and then set in the sending frame register 12 by a set signal SET from the interface control circuit 16. The sending and receiving frame registers 12 and 13 are respectively divided into two stages 12a, 12b and 13a and 13b, which are provided for transmitting one transmission frame in two transmission periods because the bus width of the data bus 4a is small. Where the bus width is large, the transmission frame can be sent out at one time and the receiving and sending frame registers may each be one-stage.

Immediately when detecting, by the signal SET, the setting of the data in the sending frame register 12, the processor coupling control circuit 11 sets the flip-flop 14 to derive therefrom an output "1" in preparation for a command from the bus control unit 5. The bus control circuit 51 of the bus control unit 5 controls the use of the bus by scanning addresses of respective processors connected to the data bus 4a. When the decoder 15 of the processor coupling unit 1 detects that the address scanning is directed to the processor coupling unit 1, the decoder 15 provides an output "1" to both the processor coupling control circuit 11 and the gate circuit G16. As a consequence, at this timing, the output from the gate circuit G16 becomes "1", which is applied as a transfer request signal RQ to the bus control circuit 51 via the control bus 4b. Upon receipt of the transfer request signal RQ from the processor coupling unit 1, the bus control circuit 51 stops the address scanning and allows the processor coupling unit 1 to exclusively use the data bus 4a and the control bus 4b and, at the same time, sends an instruction read signal R1 via the control bus 4b to the processor coupling unit 1. Receiving the instruction read signal R1, the processor coupling control circuit 11 applies a gate signal GR1 to the output gate circuit G12b, by which the instruction word in the transmission frame set in the sending frame register 12 is sent out first to the bus control unit 5 via the data bus 4a.

As the bus control circuit 51 also applies the instruction read signal R1 to the input gate circuit 52a of the instruction word register 52, the instruction word sent out from the processor coupling unit 1 is set in the instruction word register 52. Similarly, at the next timing, the bus control cuircuit 51 provides a data read signal R2, by which the data set in the sending frame register 12 is set in the data word register 53 of the bus control unit 5.

Then, the bus control circuit 51 decodes the instruction word in the instruction word register 52 by the decoder 54. When detecting that the content of the instruction word is an instruction for writing data in the terminal unit T11, the bus control circuit 51 provides an instruction word write signal W1 via the device coupling unit 2 to the terminal unit T11 and, at the same time, applies the instruction word write signal W1 to the output gate circuit 52b to open it, so that the instruction word set in the instruction word register 52 is written in the terminal unit T11 via the data bus 4a and the device coupling unit 2. In a likewise manner, the bus control circuit 51 generates a data word write signal W2, by which the data word set in the data word register 53 is written in the terminal unit T11.

The above is the operation of each unit in the case of writing the data from the central control station CPU1 in the terminal unit T11. Data transmission from the terminal unit T11 to the central processing unit CPU1 or from the central control staton CPU1 to a terminal unit T11 of another port via the communication control unit 3 is also performed in a similar manner.

As described above, in the conventional port, for example, if the transmission frame which is sent out from the central processing unit CPU1 to the terminal unit T11 for testing it is misaddressed to a terminal unit T1N, faulty data is written therein because there is not provided anywhere in the system a device for inhibiting such an erroneous access of the transmission frame.

SUMMARY OF THE INVENTION

An object of this invention is to facilitate system enlargement and maintenance in a data transmission system.

Another object of this invention is to prevent terminal units in normal operation from being affected by a program error or operation error of a system diagnosis during system enlargement or maintenance.

Briefly stated, according to the present invention, a mode setting circuit for setting the operating mode (a normal mode, a test mode, etc.) of a terminal unit and collating means for collating (1) the mode setting information set in the mode setting circuit to define the operating mode of the terminal unit and (2) the mode assignment information included in a transmission frame from a central control station with each other are provided either in a processor coupling unit, a bus controller and/or device coupling unit of a port. In data transmission from a processor unit to a terminal unit, the mode indicating information is included in the transmission frame, and the mode indicating information and the mode setting information set in the mode setting circuit are collated by the collating means, and only in the case of coincidence is the data transmission request considered valid and allowed to occur.

DESCRIPTION OF THE PREFERRED EMBODIMENTS

Figure 3:
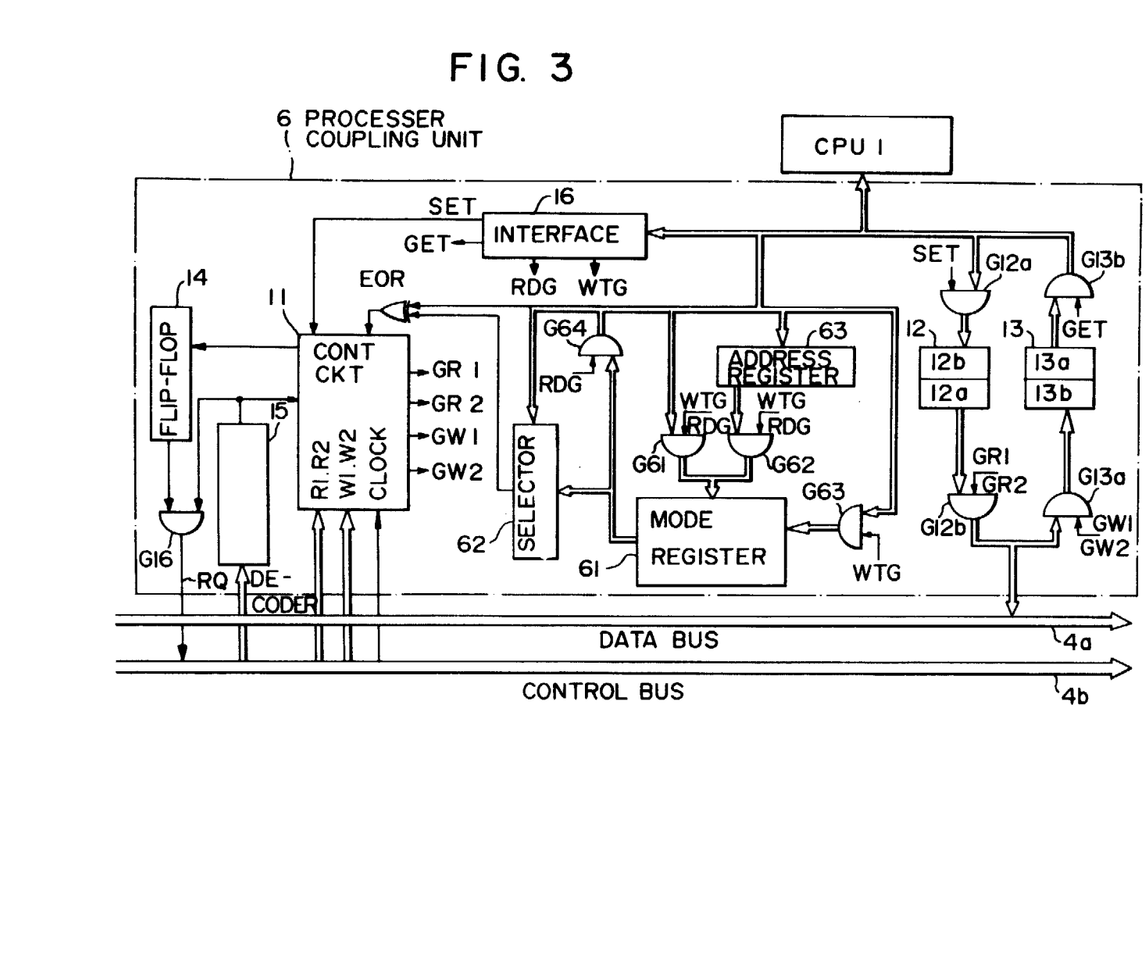
FIG. 3 is a block diagram illustrating a processor coupling unit of an embodiment of this invention.

FIG. 3 is a block diagram of an embodiment of this invention, involving a processor coupling unit 6. This includes a mode register 61; a selector 62; an address register 63; AND gates G61 to G64; and an exclusive OR circuit EOR. Reference numerals 4a, 4b, 11 to 16, G12a, G12b, G13a, G13b, G16 and CPU1 show the same parts as those indicated by the same reference numerals in FIG. 2.

The processor coupling control unit 11 receives a clock signal, an instruction word read signal R1, a data word read signal R2, an instruction word write signal W1 and a data word write signal W2 from a bus controller via the control bus 4b and further receives a signal SET from the interface control circuit 16, an output signal from the exclusive OR circuit EOR and an output signal from the decoder 15, and produces a set signal for the transfer request flip-flop 14 and gate signals GR1, GR2, GW1 and GW2.

The mode register 61 is to register therein in advance whether each terminal unit of the system is in its normal or diagnostic mode. That is, depending on whether the terminal unit is in the normal or diagnostic mode, "1" or "0" is written in the mode register 61 at the address corresponding to the address number of the terminal unit. Accordingly, a setting circuit may be formed with a register or a memory. Mode setting information is written in the mode register 61 from the central control station CPU1 in the following manner. When the address of a terminal unit of a port is set in the address register 63 in corresponding to the selected terminal unit, the address of the terminal unit whose mode is to be set, in the mode register 61, is transmitted via a write AND gate G62, and the mode setting information is written in the assigned address of the mode register 61 via an AND gate G63 from the central control station CPU1. In the case of checking the content of the mode register 61, a read gate signal RDG is applied to each of the AND gates G62 and G64, by which the content of the mode register 61 can be read out. A write gate signal WTG and the read gate signal RDG are yielded by the application of a command to the interface control circuit 16.

A description will hereunder be given of the operation of the processor coupling unit 6 in the case of data being sent out from the central control station CPU1 to any one of the terminal units.

A data word and an instruction word composed of information such as its destination and so on, sent out of the central control station CPU1, are set in the sending frame register 12 via the input gate circuit G12a. When the processor coupling control circuit 11 detects, by the signal SET, that the data is set in the sending frame register 12, the address information of the central control station which corresponds to the port having accomodated therein the receiving terminal unit is provided via an AND gate G61 to the mode register 61 to read out therefrom the content corresponding to the address of the port. The content read out of the mode register 61 contains mode information of all terminal units of the port including the receiving terminal unit. Then, for selecting the mode setting information of the accessed terminal unit from the content thus read out of the mode register 61, the address information from the central control station CPU1 which corresponds to the terminal unit being accessed is applied to one input terminal of the selector 62, by which the mode setting information of only the accessed terminal unit is selected from the parallel outputs of the mode register 61.

The output from the selector 62 is provided to one of the input terminals of the exclusive OR circuit EOR serving as collating means, in which an exclusive OR operation is performed between the selector output and the mode assignment information applied to the other input terminal from the central control station CPU1. Accordingly, the exclusive OR circuit EOR produces an output "1" when both input signals are the same and "0" when they differ. The output from the exclusive OR circuit EOR is provided to the processor coupling control circuit 11.

The processor coupling control circuit 11 does not set the transfer request flip-flop 14 when the output from the exclusive OR circuit EOR is "0" but sets the flip-flop 14 when the output is "1". As a consequence, the mode setting information of the terminal units preset in the mode register 61 and the mode assignment information sent out with each transmission of data from the central control station are collated by the collating means, and in the case of noncoincidence of this mode information, the flip-flop 14 is not set. Unless the flip-flop 14 is set, even if the scan address received from the bus controller via the control bus 4b is decoded by the decoder 15 to detect that the processor coupling unit 1 is assigned, the output from the AND gate G16 is "0"; namely the transfer request signal RQ is not provided. Accordingly, the bus controller does not achieve the control that allows the processor coupling unit 6 to occupy the control bus 4b; therefore the instruction word read signal R1 and the data word read signal R2 are not provided via the control bus 4b to the processor coupling control circuit 11 and the data set in the sending frame register 12 is not provided on the data bus 4b.

In the event of coincidence of the mode setting information and the mode assignment information, the flip-flop 14 is set, in which case the operations as described previously in connection with FIG. 2 are carried out. That is, when the processor coupling unit 6 is assigned by the scan address received via the control bus 4b from the bus controller, the AND gate G16 produces an output "1". Since this output is the transfer request signal RQ, the bus controller permits the processor coupling unit 16 to occupy the data bus 4a and the control bus 4b, and the instruction word read signal R1 and the data word read signal R2 are applied via the control bus 4b to the processor coupling control circuit 11 to derive therefrom the gate signals GR1 and GR2. As a result of this, the data set in the sending frame register 12 is provided via the AND gate G12b on the data bus 4a.

As described above, only in the case of coincidence of the mode setting information and the mode assignment information, does the data transmission take place, and there is no possibility that data of the diagnostic mode is transmitted to a terminal unit in the normal mode.

According to the foregoing embodiment, in a data transmission system in which a plurality of ports, each having connected thereto a plurality of terminal units via a common bus, are interconnected in a linear, circular or network form, a setting circuit for setting the operation mode of each terminal unit is provided in a processor coupling unit at each port which couples the port with a central processing unit, and upon each occurrence of data transmission from the central processing unit, mode setting information of the setting circuit and mode assignment information from the central processing unit are checked for coincidence between them, and only in the case of coincidence, is the data from the central processing unit thusly validated. If data of the diagnostic mode is misaddressed to a terminal unit in its normal operation during system diagnosis, the mode setting information and the mode assignment information do not agree with each other, so that the data of the diagnostic mode is not written in the terminal unit in its normal operation. This facilitates an enlargement and maintenance of the data transmission system and provides for enhanced reliability of the system.

In view of the fact that recent system enlargements are always accompanied by the setting up of terminal units as well as an electronic computer serving as a central control station, the improved operating system of the present invention also facilitates system enlargements and modifications without involving any modifications of the existing system.

Figure 4:
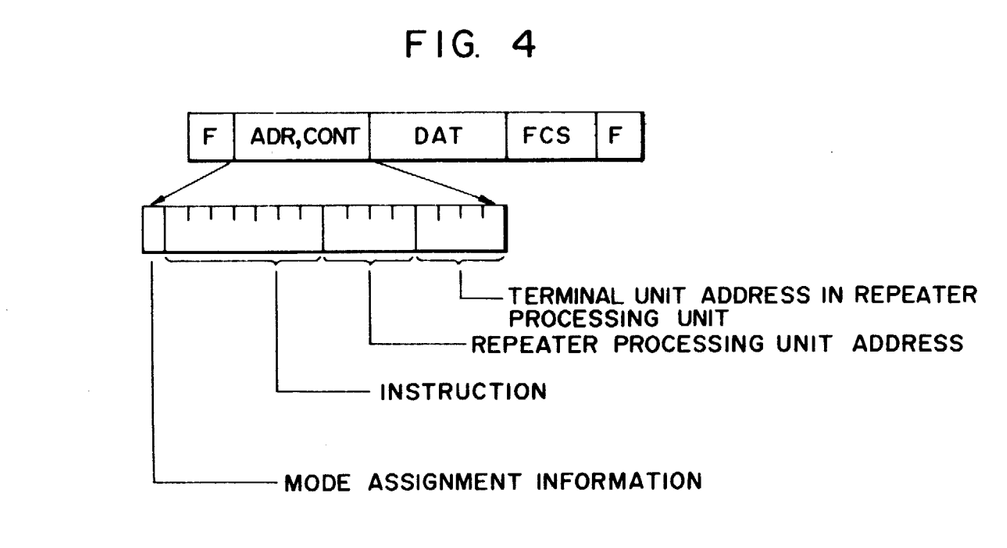
FIG. 4 is explanatory of the format of a transmission frame in the embodiment of this invention.

The mode assignment information, which is provided upon each occurence of data transmission from the central control station CPU1, is applied to the processor coupling unit 16 by a command directly from the central control station CPU1 in the foregoing, but instead of this, it is also possible to assign a certain bit of the transmission frame to the mode assignment information and send it out along with the data from the central control station CPU1. FIG. 4 shows the configuration of such a transmission frame including frame synchronization flags F; an address part ADR including address information of an accessed terminal unit and so on; a control part CONT including control information such as read or write information; a data word DAT composed of data information; and a frame check sequence FCS. For example, if the address part ADR and the control part CONT are made up of 16 bits, they may be composed of mode assignment information (1 bit) for assigning whether the operation mode is a normal or diagnostic one, an instruction (7 bits), a port address (4 bits) indicating the port in which the accessed terminal unit is accomodated and a terminal unit address (4 bits) in the port indicating the accessed terminal unit in the port. In the case of using such a frame configuration, the numbers of ports of the data transmission system and terminal units connected to each port which can be assigned are respectively sixteen at maximum.

Figure 5:
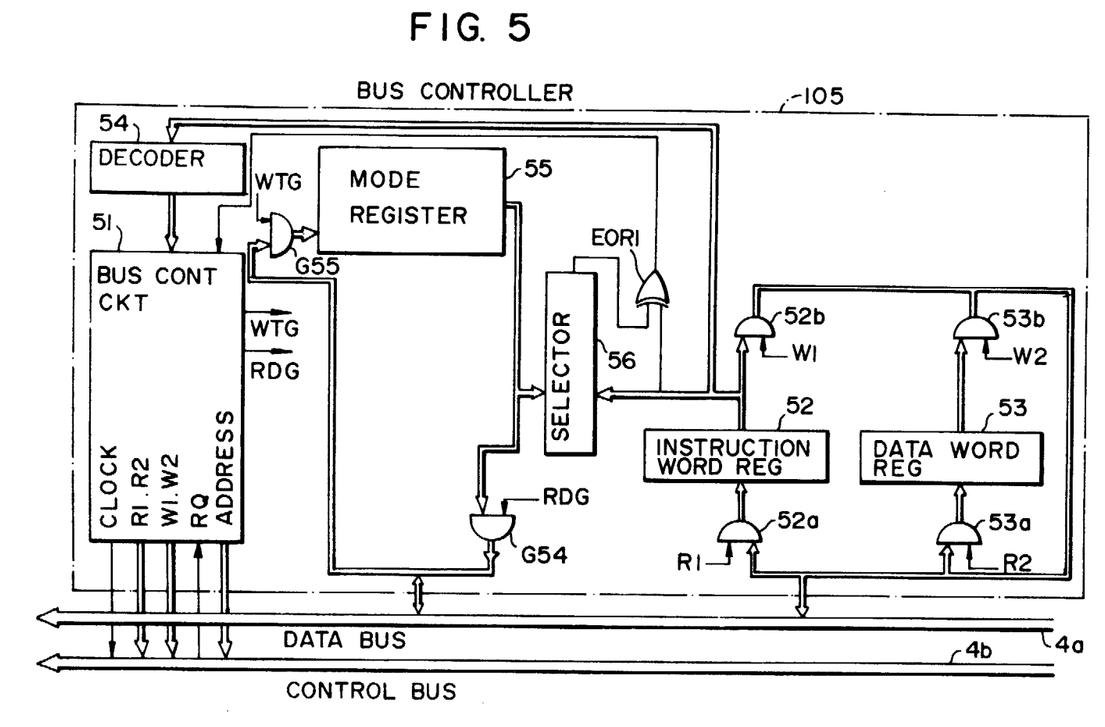
FIG. 5 is a block diagram showing a bus controller of another embodiment of this invention.

FIG. 5 is a block diagram illustrating the bus controller of another embodiment of this invention showing the bus controller 105, to include a mode register 55; a selector 56; AND gates G54 and G55; and an exclusive OR circuit EOR1. The parts identified by 51 to 54 and 4a and 4b are the same as those indicated by like reference numerals in FIG. 2.

The bus control circuit 51 provides a clock signal on the control bus 4b and, for the setting of mode setting information in the mode register 55, outputs the write gate signal WTG and, in the checking of the content of the mode register 55, outputs the read gate signal RDG. Further, upon reception of the transfer request signal RQ via the control bus 4b, the bus control circuit 51 provides the instruction word read signal R1 and the data word read signal R2, and if the output from the exclusive OR circuit EOR1 is "0", the bus control circuit 51 outputs the instruction word write signal W1 and the data word write signal W2. The content set in the instruction word register 52 is decoded by the decoder 54 and the decoded output is applied to the bus control circuit 51, which, in turn, provides the address of the accessed terminal unit on the control bus 4b.

The mode register 55 is similar to that employed in the embodiment of FIG. 3 and sets mode setting information corresponding to each terminal unit. The mode setting information is written in the mode register 55 from a central control station via the data bus 4a. That is, the content set in the instruction word register 52 via the data bus 4a is decoded by the decoder 54, and if the decoded output is found to be a write instruction for the mode register 55, the control circuit 51 provides the write gate signal WTG and the data write signal W2. As a result of this, the mode register information is set in the mode register 55 via the AND gate 53b, the data bus 4a and the AND gate G55. When it is desired to check the mode setting information set in the mode register 55, the read gate signal RDG is derived from the control circuit 51, by which the content of the mode register 55 can be provided on the data bus 4a via the AND gate G54.

A description will be made of the operation in the case of transmitting data from a central control station to a terminal unit.

At first, the instruction word read signal R1 is provided from the bus control circuit 51, and an instruction word composed of an address part including mode assignment information and the address of the accessed terminal unit and a control part is set in the instruction word register 52 from the processor coupling unit via the data bus 4a and the AND gate 52a. At the next timing, the word read signal R2 is provided from the bus control circuit 51 and a data word from the processor coupling unit is set in the data word register 53 via the data bus 4a and the AND gate 53a.

Next, the parallel outputs from the mode register 55 are applied to the selector 56 and, at the same time, the address information of the accessed terminal unit from the instruction word register 52 is applied to the selector 56, in which the mode setting information of the accessed terminal unit in the mode register 55 is selected. The output from the selector 56 is provided to one input terminal of the exclusive OR circuit EOR1 and the mode setting information of the accessed terminal unit set in the instruction word register 52 is applied to the other input terminal of the exclusive OR circuit EOR1, in which the mode setting information and the mode assignment information are collated.

The output from the exclusive EOR1 is supplied to the bus control circuit 51, and when the output from the exclusive OR circuit EOR1 is "1", that is, in the case of noncoincidence of the mode information, the bus control circuit 51 neither proceeds to the next state nor provides the instruction word and data word write signals W1 and W2 to the AND gates 52b and 53b. Accordingly, when the mode assignment information in the transmission frame and the mode setting information of the terminal unit preset in the mode register 55 differ, no data is transmitted to the terminal unit. Conversely, when the output from the exclusive OR circuit EOR1 is "0", that is, in the case of coincidence of the mode information, the bus control circuit 51 provides the instruction word and data word write signals W1 and W2 to the AND gates 52b and 53b, so that the contents of the instruction word and data word registers 52 and 53 are provided on the data bus 4a, transmitting data to the terminal unit.

As described above, in the bus controller 105, coincidence of the present mode setting information of each terminal unit and the mode assignment information in the transmission frame is detected for each transmission frame, and in the case of noncoincidence, the transmission frame is made invalid. Accordingly, only data of the normal mode is written in a terminal unit in the normal mode, and data of the diagnostic mode is not ever written in a terminal unit in the normal mode.

Figure 6:
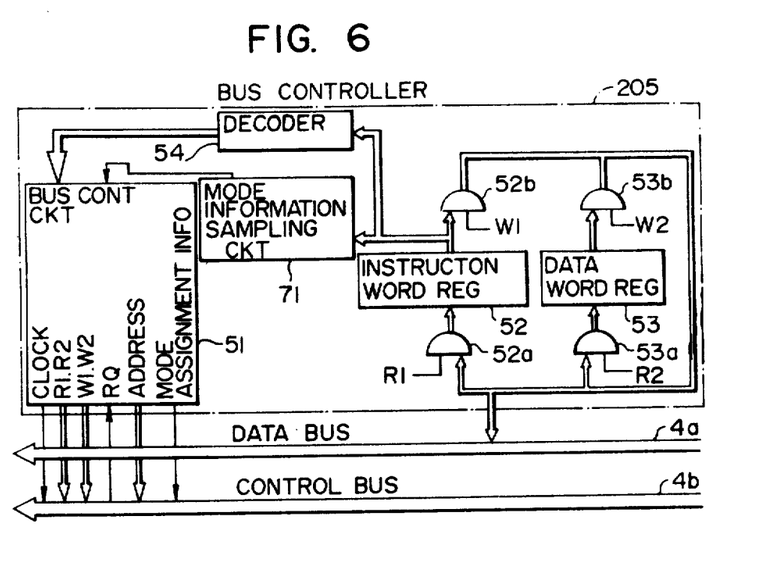
FIG. 6 is a block diagram showing a bus controller of still another embodiment of this invention.

FIG. 6 shows in block form the bus control circuit in accordance with another embodiment of this invention, indicating a bus controller 205 and a mode information sampling circuit 71. The other reference numerals which are the same as those in FIG. 5 indicate like parts.

Figure 7:
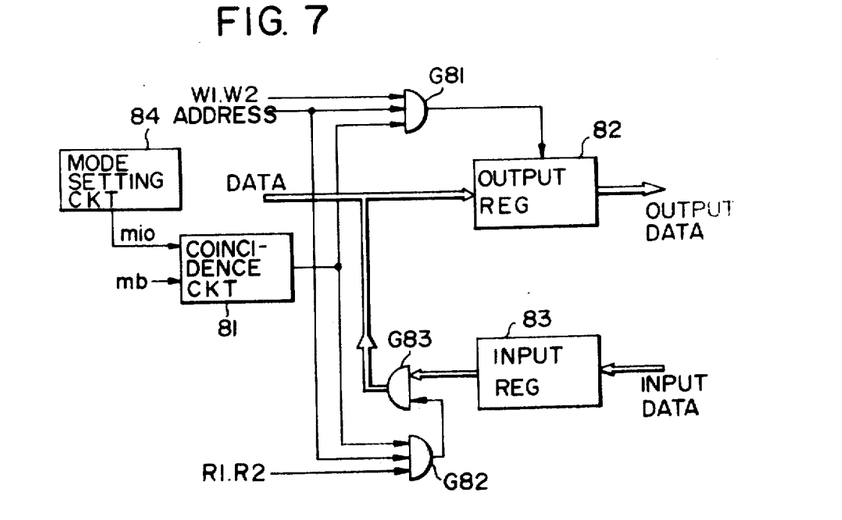
FIG. 7 is a block diagram illustrating the principal part of an example of an interface of a terminal unit which is controlled by the bus controller of FIG. 6.

FIG. 7 shows an example of the construction of an interface unit of each terminal unit when the bus controller is constructed as illustrated in FIG. 6. FIG. 7 indicates a mode coincidence circuit 81 for detecting coincidence between a mode assignment signal mb from the bus control circuit 51 and a mode setting signal mio of each terminal unit; an output register for setting write information 82; an input register having set therein read information 83; a mode setting circuit 84; and AND gates G81 and G83.

As in the case of the above-described embodiment, upon reception of the transfer request signal RQ, the bus control circuit 51 provides the instruction word and data word read signals R1 and R2 to read an instruction word and a data word in the instruction word register 52 and the data word register 53, respectively, via the data bus 4a and the AND gates 52a and 53a. In this case, the mode information sampling circuit 71 picks up only mode assignment information from the instruction word set in the instruction word register 52, and this mode assignment information is provided to the bus control circuit 51. The bus control circuit 51 provides the instruction word and data word write signals W1 and W2 to the terminal unit of the address decoded by the decoder 54 and, at the same time, applies the mode assignment information from the mode information sampling circuit 71 to the accessed terminal unit via the control bus 4b in synchronism with the application of the signals W1 and W2.

In the interface unit of the terminal unit, the mode setting information mb supplied from the bus control circuit 51 and the mode setting information mio preset by an external switch or the like in the mode setting circuit 84 are compared by the coincidence circuit 81. The coincidence circuit 81 provides gate signals to the AND gates G81 and G82 when both mode information signals are the same, and does not provide the gate signals when the information signals differ. Accordingly, when the mode setting information mio and the mode assignment information mb are coincident with each other, the instruction word and data word write signals W1 and W2 from the bus control circuit 51 and the address information are applied to the AND gate G81 to derive therefrom an output "1" and, as a result of this, data is set in the output register 82, that is, written in the terminal unit. Conversely, when both mode information signals do not coincide, the output from the AND gate G81 becomes "0", so that no data is set in the output register 82; namely no data is written in the terminal unit.

In this embodiment, setting of the operating mode of each terminal unit is achieved by the mode setting circuit 84, and the mode setting information and the mode assignment information from the bus control circuit 51 are compared with each other for each transmission frame, and only in the case of coincidence of both signal is data written. Therefore, during system diagnosis, if the mode setting information of a terminal unit in normal operation is set to the normal mode, there is no likelihood that a transmission frame of the diagnostic mode is written in the terminal unit by mistake.

As described above, according to this embodiment, in a data transmission system in which a plurality of ports, each having connected thereto a plurality of terminal units via a common bus, are interconnected in a linear, circular or network form, mode assignment information is provided in a transmission frame for assigning whether the transmission frame is in the normal or diagnostic mode, and a setting circuit for setting the operating mode of each of the terminal units is provided for each terminal unit or in a bus control circuit for controlling the common bus. Upon each occurence of the transmission frame, coincidence between the mode setting information of the setting circuit and the mode assignment information is detected, and only in the case of coincidence, is the transmission frame made valid. Once a terminal unit in normal operation is set to the normal mode during system diagnosis, a transmission frame of the diagnostic mode is not ever written in the terminal unit of the normal mode. Consequently, system enlargement and maintenance become easy and a highly reliable system can be realized.

In the present invention, if the mode assignment information in the transmission frame and the mode setting information on the side of hardware are rendered into plural modes of two or more bits and if the modes are each assigned to each central processing unit, it is possible to have one-to-one correspondence between terminal units and central processing units, so that when it is desired to install a plurality of central processing units in a data highway, a data transmission system can be contructed which is free from interference from the other central processing units.

In other words, two or more bits may be used as the mode assignment information in a transmission frame and as the mode setting information on the hardware side, that is, one of the bits is used for assignment of the normal or diagnostic mode of the transmission frame, as described previously, and the remaining bits may be used, for example, for assignment of central processing units for controlling similarly specified terminal units. The number of central processing units that can then be assigned is $2^{N-1}$, if the total number of the bits in the mode assignment information is N, and the transmission frame will then perform an operation only when the assignment by the central processing unit of the normal or diagnostic mode of the terminal is coincident with that in the mode information in the transmission frame. Thus, when a plurality of central processing units are provided in a data highway, a data transmission system can be constructed which is entirely free from interference of other central processing units. Thus, it is feasible to use the above-said remaining bits for assignment of the terminals to be used, independently of the selected central processing unit, by which the operating levels ($2^{N-1}$ in the case of the total bits being N) can be set at will for each terminal unit and for each selected central processing unit.

It will be apparent that many modifications and variations may be effected without departing from the scope of the novel concepts of this invention.

What is claimed is:

1. A system for selectively controlling the transmission of data selectively between plural central processing units and plural terminal units, said system comprising at least two ports selectively connected to said processing and terminal units, each said port being directly connected to at least one of said processing and terminal units, at least one common bus comprising a data highway for interconnecting said ports, and at least one other common bus within each said port for connection within said port with the respective processing and terminal unit(s) connected to each said port, mode set means in plural selected ports for receiving, storing and outputting mode set information representing the mode of operation in which each of a first selected group of said terminal units is to be operated, means in at least one of said processing units for supplying said mode set information to said mode set means, and for supplying mode assignment information corresponding to said mode set information for a respective one of said terminal units of said first group when said processing unit provides an instruction to said respective terminal unit, said instruction involving a data transfer involving said terminal unit, collating means in a selected plurality of said ports for selectively comparing said mode set information with said mode assignment information for said respective terminal unit corresponding to said instruction for allowing the transmission of data corresponding to said instruction only if said mode set and mode assignment information of said respective terminal unit coincide.

2. The system of claim 1, at least one of said ports comprising said mode set and collating means at least for those of said selected terminal units of said first group that are connected to the same respective port.

3. The system of claim 1 or 2, at least one of said ports having one of said central processing units connected thereto comprising a respective processor coupling unit, and said processor coupling unit comprising said mode set means and said collating means at least for those of said selected terminal units of said first group that are connected to the same respective port as said processor coupling unit.

4. The system of claim 1 or 2, at least one of said ports comprising a bus controller unit, and at least one of said bus control unit(s) comprising said mode set means and said collating means for at least those of said selected ones of said first group of terminal units that are connected to the same respective port.

5. The system of claim 1 or 2, each said port comprising a bus controller, at least one of said bus controller(s) comprising a mode information sampling circuit for receiving said mode assignment information for at least one of said first group of selected terminal unit that is connected to the same respective port, and said at least one terminal unit of said same respective port containing said bus controller comprising said mode set means for receiving said mode set information of said terminal unit and said collating means for comparing said mode set information and said mode assignment information prior to transferring data in correspondence to one of said instructions to the same respective terminal unit from one of said central processing units.

6. The system of claim 1, 2, 3, 4 or 5, said at least one processing unit(s) comprising said means for supplying said mode set information of a selected terminal of said first group comprising means for including said mode assignment information in said instruction to said terminal unit for said data transfer.

7. The system of claim 1, 2, 3, 4 or 5 comprising said ports being connected in a circular network.

8. The system of claim 1, 2, 3, 4 or 5 comprising said ports being connected in a linear network.

* * * * *